United States Patent Office 3,552,203
Patented Jan. 5, 1971

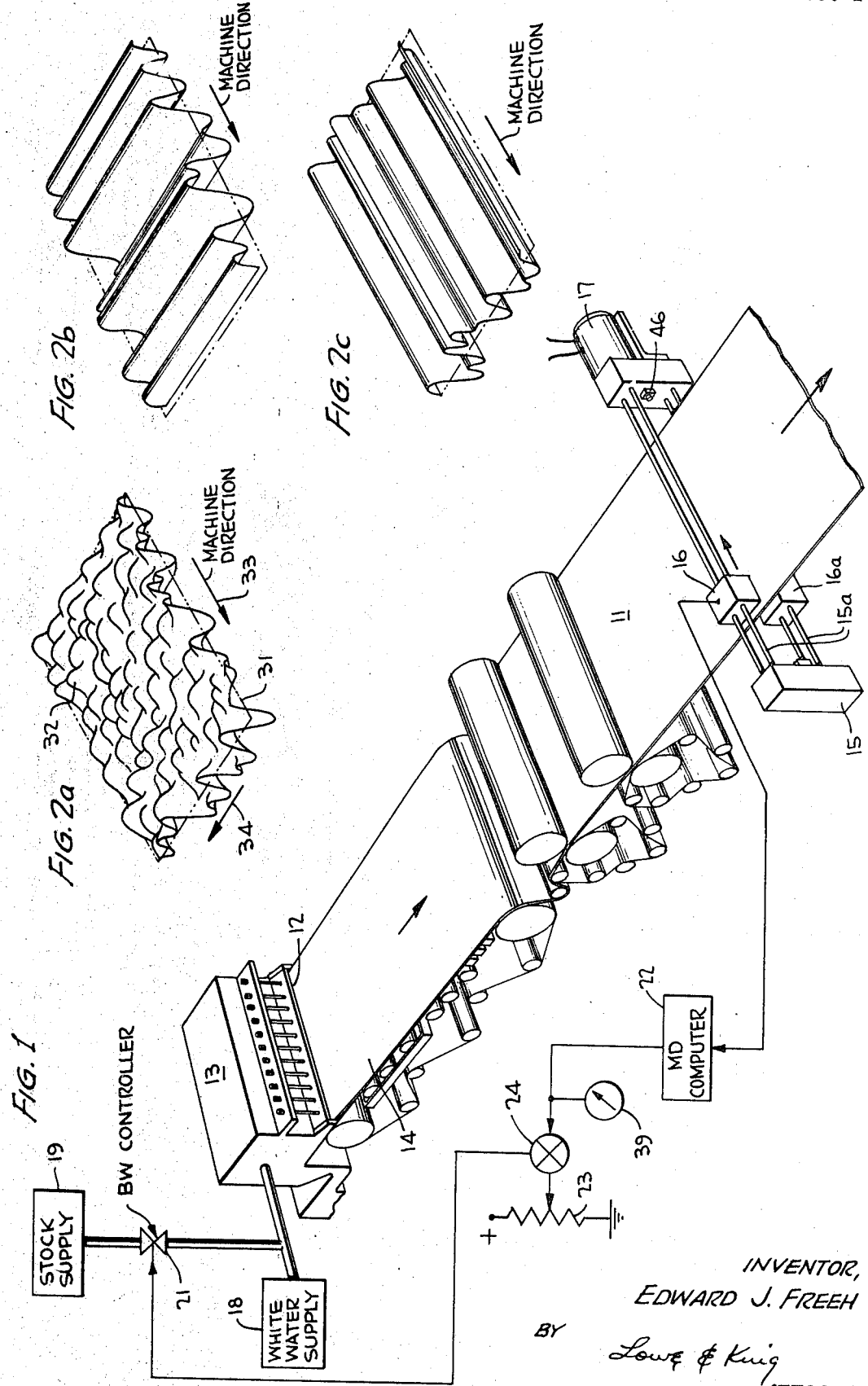

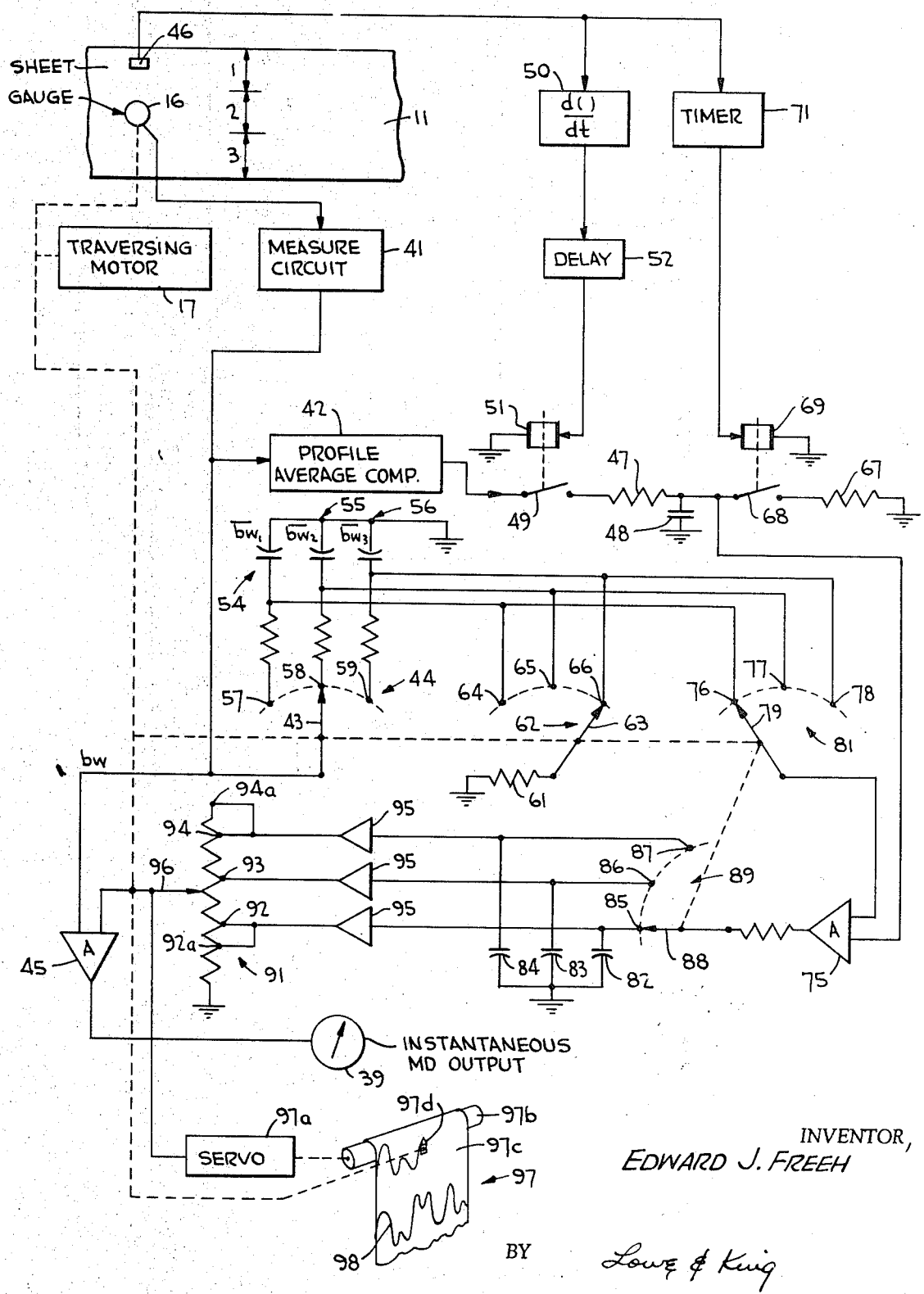

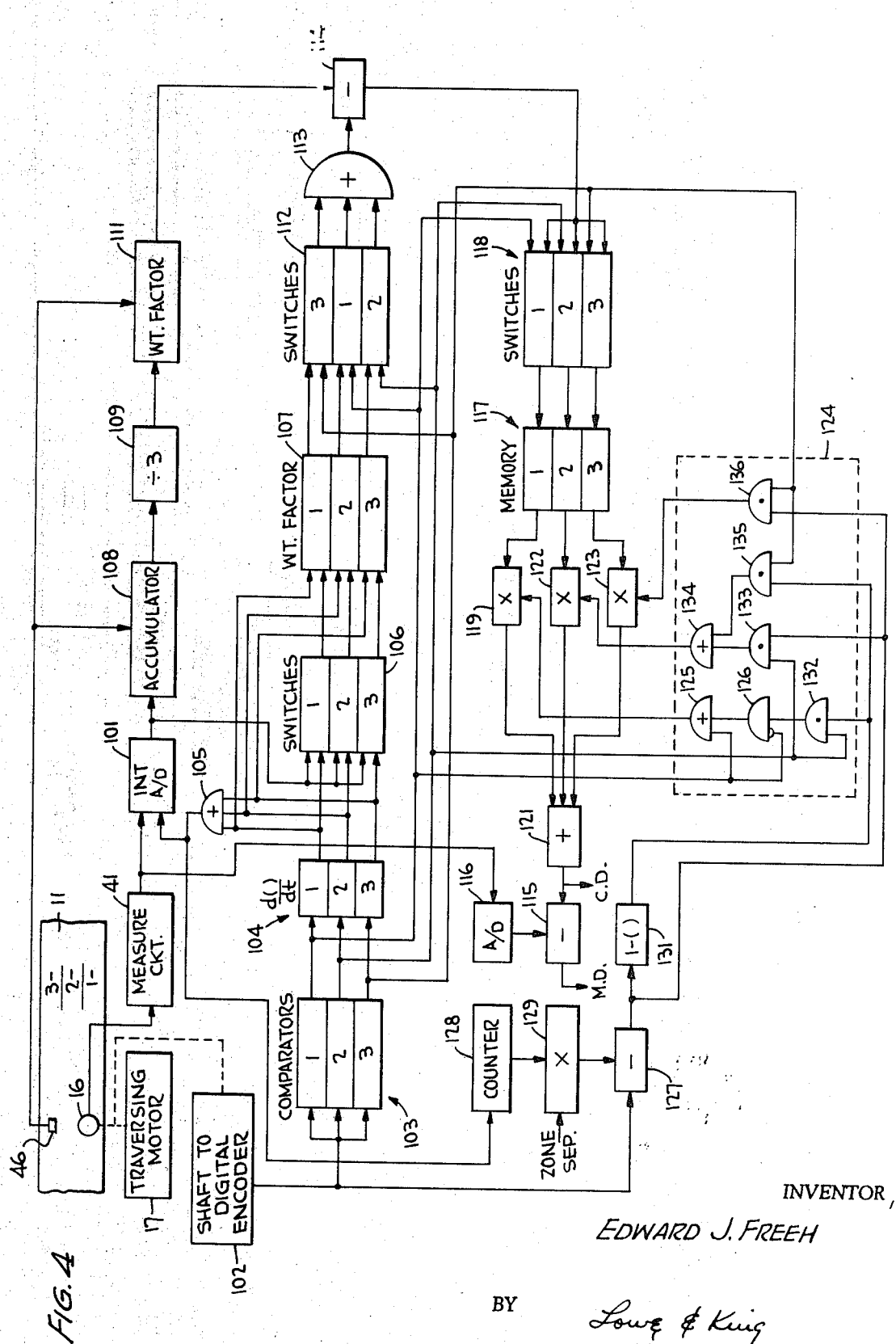

3,552,203
SYSTEM FOR AND METHOD OF MEASURING SHEET PROPERTIES
Edward J. Freeh, Tucson, Ariz., assignor to Industrial Nucleonics Corporation, a corporation of Ohio
Filed Nov. 13, 1967, Ser. No. 682,336
Int. Cl. G01n 33/34; D21f 7/06
U.S. Cl. 73—159    53 Claims

ABSTRACT OF THE DISCLOSURE

A machine direction property of a moving sheet is measured by determining deviations between the average value of the property in a plurality of zones in a cross direction and an average value of the property for all the zones, as derived from a detector scanning across the sheet, and comparing the deviations with the detector output. The detector scans across the sheet a number of times to accumulate the deviations in each zone over a long time interval. Measurements made during successive scans are time weighted. Measurements between zones are interpolated as a function of a detector position. A machine direction parameter is controlled in response to the measured machine direction property.

---

The present invention relates generally to a system for and method of measuring sheet properties and more particularly to a system and method wherein machine direction properties are determined in response to a property measurement derived from a plurality of machine direction locations.

Sheet materials, for example paper, are subject to property variations along the sheet length and width. In the sheet manufacturing art, the variations along the sheet length and width are respectively termed machine direction and cross direction variations. Cross direction variations arise, for example, as a result of differences in the amount of material fed to different regions across the process during sheet formation, while machine direction variations frequently occur in response to differences in the total amount of material fed to the sheet formation process at different times. For example, in paper manufacturing, weight per unit area, termed basis weight, is controlled in the cross direction by the rate of flow of the liquidous stock emerging from different regions of a head box slice, while machine direction basis weight is responsive to a ratio of fiber to water applied to the head box.

The technique generally utilized in the prior art for controlling the machine direction properties of a sheet involves measuring the average value of the property across the sheet in response to a single scan of a property detector between the sheet edges. While the prior art technique is satisfactory for certain processes, it is responsive to short duration, random variations of the property, as well as long term cross direction variations. Hence, machine direction control utilizing the prior art technique may be responsive to uncorrectable short term, random variations or be influenced adversely by long term cross direction variations.

According to the present invention, long term cross direction variations of a sheet property are derived by computing the deviation between the average value of the property in each of a plurality of zones in the cross direction relative to the average property value for all of the zones. By repeating the deviation computation at a number of different machine direction sheet positions and averaging the computations, short duration, random variations of the property are removed from the computed results. Preferably, the computations are made in response to a single detector scanning across the sheet. To provide an indication of machine direction properties at any instant, without the random and cross machine variations substantially influencing the machine direction computation, the detector output is compared with the calculated deviation for the position of the detector across the sheet.

An ancillary feature of the invention is that the deviation for each position of the detector across the sheet is approximately derived as a continuous function even though discrete zone values of deviation are calculated. To this end, the discrete zone values are combined together and interpolated as a function of detector scan position.

An important feature of the present invention is that the sequentially derived deviations are time weighted, whereby those deviations for the most recent scan have a larger proportional value than deviations resulting from prior scans. The time weighting process is preferably exponential with the result that measurements made in the distant past are considered with virtually a zero factor, measurements made in the intermediate past are slightly considered, and most recent measurements have the most influence on the deviation computation.

The measurement of machine direction properties can be utilized either for analyzing the manufactured sheet or for controlling a sheet parameter in the machine direction. In the latter instance, the control can be either automatic or by hand and is not subject to short duration, random fluctuations nor cross direction variations. Since the random variations have an average value of zero it is undesirable to attempt to control a machine direction parameter in response thereto. Variations resulting from differences in sheet formation at different points across the sheet, causing cross direction variations, should have no influence on machine direction properties. Therefore, the system and method of the present invention enable the manufacture of a sheet with greater machine direction uniformity than prior art techniques, whereby advantages of economics and customer satisfaction are achieved.

It is, accordingly, an object of the present invention to provide a new and improved system for and method of deriving an indication of a machine direction property of a sheet.

Another object of the present invention is to provide a new and improved system for and method of deriving a signal proportional to the average deviation of a sheet property in the cross direction.

Another object of the present invention is to provide a new and improved system for controlling machine direction characteristics of a sheet during formation, without regard to cross direction variations.

A further object of the present invention is to provide a system for and method of measuring machine direction properties of a sheet by scanning a single detector across the sheet a plurality of times.

The detailed description of the present invention to follow is described in terms of maintaining machine direction basis wight of a paper sheet substantally uniform. It is to be understood, however, that other paper sheet properties, such as moisture, could be measured and controlled, and that other types of sheet materials, such as steel or plastic films, could be measured and controlled utilizing the techniques and apparatus of the present invention.

The above and still further objects, features and advantages of the present invention will become apparent upon consideration of the following detailed description of several specific embodiments thereof, especially when taken in conjunction with the accompanying drawings, wherein:

FIG. 1 is a partially schematic and a partially perspective view of a controller employing the present invention;

FIGS. 2a–2c are perspective views indicating manner in which sheet properties may vary;

FIG. 3 is a circuit diagram of a preferred embodiment of an analog computer which may be utilized in the system of FIG. 1;

FIG. 4 is a block diagram of a preferred embodiment of a digital computer which may be utilized in the system of FIG. 1, in lieu of the analog computer.

Figure 5:
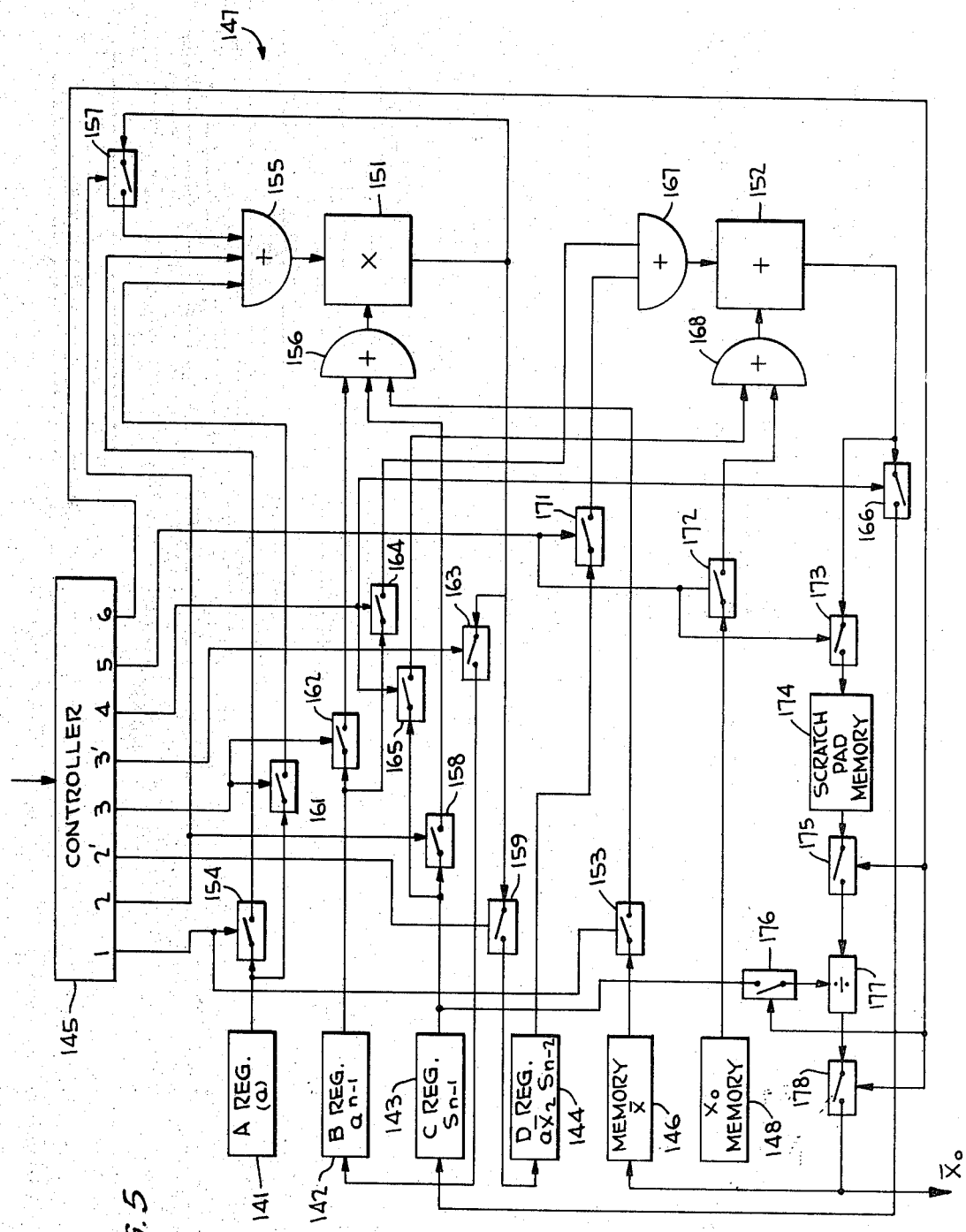
FIG. 5 is a block diagram of a preferred embodiment of a time weighting computer used in FIG. 4.

Reference is now made to FIG. 1 of the drawings wherein there is illustrated a system for and method of controlling basis weight of paper sheet 11 during formation. Paper sheet 11 is formed in response to a high velocity jet of water and fiber mixture emerging from slice 12 of head box 13. The jet emerging from slice 12 is directed toward moving conveyor or Fourdrinier wire 14, which causes some of the moisture in the sheet being formed to be drained.

Downstream of Fourdrinier wire 14 is positioned scanning gauge mount 15, which supports nuclear radiation gauge detector head 16 and radiation source housing 16a on traversing guide tubes 15a. Head 16 and housing 16a are scanned across the width of paper sheet 11, from one edge thereof to the other, whereby radiation gauge detector 16 derives a signal proportional to the basis weight of sheet 11.

Head box 13 receives a mixture of relatively clear water from supply 18 and fiber stock from supply 19. The ratio between the fiber and water in the mixture delivered to head box 13 is controlled by basis weight valve 21 in a line leading to fiber supply 19. It is one of the objects of the present invention to control valve 21 whereby basis weight is maintained uniform at different points along the length of sheet 11, i.e., in the machine direction.

Control of valve 21 is in response to signals derived by scanning detector 16 across sheet 11. The responses from a plurality of scans by gauge 16 across sheet 11 are fed to computer 22, which derives a signal proportion to the instantaneous machine direction basis weight, without significant regard to random variations of sheet basis weight or cross direction basis weight variations.

The output of computer 22 is compared with a target or set point value derived from potentiometer 23 in differential amplifier network 24. The output of differential amplifier 24, a measure of the difference between the target value for machine direction basis weight as set into potentiometer 23 and the actual machine direction basis weight as derived from computer 22, is coupled to motorized valve 21. Thereby, valve 21 is set at a position to achieve the desired machine direction basis weight.

To provide a better and more complete understanding of the concepts involved in cross direction, machine direction and random variations, reference is now made to FIGS. 2a–2c of the drawings. In FIG. 2a is illustrated a three dimensional, topographical plot of basis weight of a typical sheet passing the region of detector 16, assuming that none of the controls of the present invention is utilized. Basis weight is plotted in FIGS. 2a–2c as an amplitude or height relative to plane 31 by solid line topographical characteristics 32. Basis weight for the sheet in the machine direction is in a direction corresponding with arrow 33, while the cross direction is indicated by arrow 34, at right angles to arrow 33.

From a casual inspection of FIG. 2a, it appears that the basis weight of a sheet is completely random. Actually, however, the basis weight components can be divided into three separate components, viz: machine direction, cross direction and random.

As indicated by FIG. 2b, the machine direction components of basis weight are variations in sheet basis weight assuming a constant value of cross direction basis weight, i.e., the basis weight for every point across the sheet varies in the same amount from one point to another along the length of the sheet. Machine direction variations are caused by factors affecting the makeup of the sheet basis weight as a function of sheet length. One of the factors which may control machine direction basis weight is the density of fiber stock in supply 19. Variations in the density of the fiber stock in supply 19 are reflected in the machine direction basis weight of the entire sheet and yield variations as indicated by FIG. 2b. According to the invention the low frequency undulations in the curve of FIG. 2b are substantially eliminated by controlling valve 21 in response to the output of computer 22. There are other factors entering into machine direction variations, fiber stock density changes being selected as merely exemplary.

In addition to the machine direction variation in basis weight, different regions across the sheet, in the cross direction, are subject to basis weight variations, as indicated by FIG. 2c. The cross direction profile variations of FIG. 2c are based on the assumption of zero variation of basis weight in the machine direction. Hence, at any particular cross direction point, the machine direction basis weight is constant as a function of sheet length, in determining cross direction variations. Cross direction variations in basis weight arise, for example, because of differences in the quantity of the jet emerging from different points across the width of slice 12. These differences in jet quantity may arise because slice 12 has a different orifice width at differing points in the cross machine direction.

Seemingly, a combination of the cross direction and machine direction basis weights should produce all of the variations indicated by FIG. 2a. It has been found, however, that the relatively steady state characteristics of cross direction and machine direction variations do not give a complete analysis of basis weight. Because of the many different types of variables entering into the manufacture of paper, and other sheet materials, to provide a complete analysis of basis weight it has been found necessary to recognize a component referred to as random variation for accurately dividing total basis weight into its different components. The random variations can be represented as cross direction profiles having differing wave shapes at differing machine direction locations. The random components or variations are of a relatively short duration and have an average value of zero. In particular, it has been found that the random variations generally have an average value of zero if ten or more cross machine profiles of basis weight are taken at different locations along the sheet in the machine direction.

In accordance with the present invention, the random components are substantially eliminated by scanning sheet 11 with gauge 16 a sufficient number of times, such as ten or more. The cross direction variations are calculated by separating sheet 11 into a plurality of longitudinal zones, running parallel to the sheet edges, and computing the sum of the deviations between the average value of basis weight at each of the zones and the average value of basis weight over the entire width of the sheet. Since the sheet is scanned a number of times, the reading of cross machine basis weight is not affected by the random components and an average indication of cross machine variations is derived. The indication of cross machine variations is compared, by subtraction, with the instantaneous reading of gauge 16 to derive an accurate indication of instantaneous machine direction variation.

All of the foregoing calculations are performed in machine direction computer 22. As indicated supra, the machine direction indication derived from computer 22 is compared with a target setting of potentiometer 23, and the resultant comparison is utilized for opening or closing valve 21. It is to be understood, of course, that the automatic controller comprising potentiometer 23 and differential amplifier 24 can be eliminated and meter 39 can be connected to the output of computer 22. In such an event, personnel would be employed for observing meter 29 and adjust the position of valve 21 by hand; or the results of the meter reading could be applied to a recorder to provide an analysis of machine direction basis weight.

Reference is now made to FIG. 3 of the drawings, wherein there is illustrated a schematic diagram of an analog computer version of machine direction basis weight computer 22. In the computer of FIG. 3, sheet 11 is segmented into three transverse zones, designated as 1, 2 and 3. While only three zones are shown for purposes of simplicity, it is to be understood that in an actual system there are many zones across the width of sheet 11, an exemplary number being on the order of fifteen.

As radiation gauge 16 is translated across the width of sheet 11 by traversing motor 17, the gauge derives an output signal that is coupled to measuring circuit 41. Measuring circuit 41 is of the well-known type, deriving a D.C. output voltage proportional to the basis weight of the region of sheet 11 being covered by gauge 16. The basis weight output signal of measuring circuit 41 is applied in parallel to profile averaging computer 42, armature 43 of switch 44, and one input terminal of D.C. differential operational amplifier 45.

Profile averaging computer 42 is of the well-known type, generating a D.C. output voltage proportional to the average basis weight of sheet 11 for each scan of detector 16 between the edges of the sheet. Upon the completion of each scan of gauge 16 across sheet 11, the output of averaging computer 42 is stored and the computer output is reset to a zero value. To these ends, microswitch 46 is mounted on bracket 15, FIG. 1, in proximity to the edge of sheet 11 remote from the initial scan point of gauge 16 to derive an output pulse in response to the gauge reaching the edge of sheet 11 remote from the initial gauge traverse.

Activation of microswitch 46 results in the output of computer 42 being coupled to an integrator including series resistance 47 and shunt capacitor 48. The integrator and computer are connected together through normally open contacts 49 that are closed in response to energization of relay 51, coupled to microswitch 46 through differentiator-rectifier network 50 and fifteen second delay element 52. Network 50 responds only to the leading edge of the voltage generated by microswitch 46, being of the well-known type including a differentiator cascaded with a diode for passing a differentiated pulse resulting from the transient derived in response to initial activation of the microswitch.

After the output signal from averaging computer 42 has been coupled to the integrator comprising resistor 47 and capacitor 48, the computer is reset to a zero value in the conventional manner as gauge 16 is traversing across sheet 11 back to its initial starting point.

While profile average computer 42 is determining the average basis weight of sheet 11 across the entire width thereof for a complete scan of gauge 16, the average basis weight in each of the three zones is being separately computed. To this end, the output of measuring circuit 41 is applied in synchronism with the zone position of gauge 16 to each of resistance capacitance integrating circuits 54, 55 and 56 via armature 43 and switch 44. Armature 43 is driven by the output shaft of traversing motor 17 so that it alights on arcuate contacts 57, 58 and 59 while gauge 16 is passing through zones 1, 2 and 3, respectively. To provide for synchronism between the position of gauge 16 and activation of integrators 54–56, each of contacts 57–59 has an arc length corresponding with the length of each of the zones across sheet 11. A relatively narrow insulating spacer between contacts 57–59 is provided to achieve isolation between the signals coupled to the different integrating networks 54–56.

Each of integrating networks 54–56 is of the conventional series resistance, shunt capacity type, whereby the capacitor voltage of each integrator is indicative of the integral of the D.C. output of measuring circuit 41 for each of the zones. The time constants of integrators 54–56 are substantially equal, whereby the storage capacitors thereof derive the same voltage for a flat sheet, i.e., one having constant cross direction characteristics. During each scan of gauge 16 across sheet 11, each of the capacitors of integrators 54–56 accumulates charge and adds the accumulated charge to previously accumulated charges stored therein. In a manner similar to the accumulation of charge by integrators 54–56, capacitor 48 accumulates a charge indicative of the average basis weight across all of sheet 11 as derived from successive scans of gauge 16.

To prevent basis weight readings obtained in the distant past from having the same effect as more recent basis weight measurements on the average readings stored in capacitor 48 and the capacitors of integrators 54–56, the integrated values are time weighted exponentially. Exponential time weighting reduces the values stored on the capacitors by a factor $$e^{-\frac{t}{RC}}$$

for successive scans, whereby an integrated value derived from $n$ previous scans is attenuated by an exponential factor proportional to $e^{-n}$. For example, an integrated value ten scans prior to the most recent scan of gauge 16 is stored in the integrating capacitors with an attenuation factor of $e^{-10}$, while an integrated value occurring two scans previously is attenuated and stored as a value proportional to $e^{-2}$.

To accomplish exponential weighting of the voltage stored on the capacitors in integrators 54–56, resistor 61 and switch 62 are provided. Switch 62 is constructed in exactly the same manner as switch 44 to include armature 63 and arcuate contacts 64–66. Contacts 64, 65 and 66 are respectively connected to the capacitors of integrators 54, 55 and 56, while armature 63 is connected to be driven by the shaft of traversing motor 17. Armature 63 is displaced relative to armature 43 by an amount commensurate with the separation of one zone across sheet 11. Thereby, armature 63 is positioned one zone ahead of gauge 16 relative to the width of paper sheet 11.

Because of the positions of armatures 43 and 63, exponential time weighting of the charges accumulated on the capacitors of integrators 54–56 is accomplished with resistor 61 and switch 62 immediately before the application of voltage to the integrators by measuring circuit 41. This result is seen by considering an example wherein the capacitors of integrators 54–56 are initially discharged to zero volts and gauge 16 is over zone 1 in its first traverse of sheet 11. Under such circumstances, armature 43 alights on contact 57, whereby the capacitor of integrator 54 accumulates a charge proportional to the basis weight integral across zone 1 of sheet 11. Simultaneously, armature 63 alights on contact 65 and has no effect on the zero charge on the capacitor of integrator 54. While gauge 16 is crossing the second zone, armatures 43 and 63 alight on contacts 58 and 66, respectively, whereby charge is accumulated on the capacitor of integrator 55 in accordance with the integral of basis weight in zone 2 while the uncharged capacitor of integrator 56 is connected to ground through resistor 61. While gauge 16 is traversing the third zone, capacitor 56 is connected to be responsive to the output of measuring circuit 41 through the contacts of switch 44, and contact 63 is rotated in the clockwise direction to an open circuit condition past contact 66. After gauge 16 has traversed completely across sheet 11, the gauge is returned to its initial position at the edge of the zone 1.

As the shaft of traversing motor 17 drives gauge 16 back to its initial starting point, armatures 43 and 63 are lifted above the contacts of switches 44 and 62, respectively, by a suitable solenoid-operated lifting mechanism (not shown) responsive to the signal which reverses the traversing motor 17. Thereby, the circuits associated with switches 44 and 62 are inoperative while gauge 16 is returning from zone 3 to the initial position at the edge of zone 1. When gauge 16 returns to the edge of the zone 1 and prior to a second traverse of the gauge 16 across sheet 11, contacts 43 and 63 are respectively positioned slightly beyond the counterclockwise edge of contact 57 and on contact 64 at the edge in proximity to contact 65. Gauge 16 remains at the edge of zone 1 for a time period approximately equal to the interval required for the gauge to traverse one of the three zones across the width of sheet 11. Thereby, the charge accumulated on capacitor 54 during the first traverse of gauge 16 across zone 1 is discharged to a predetermined extent through resistor 61. The amount of discharge is governed by the values of resistor 61 and the capacitor included within integrator 54, as well as the time interval of engagement between contacts 63 and 64.

Upon completion of the specified time interval, traversing motor 17 is activated to translate gauge 16 across the width of sheet 11, while simultaneously rotating contacts 43 and 63 into engagement with contacts 57 and 65, respectively. The basis weight value derived while gauge 16 is scanning across zone 1, as generated by measuring circuit 41, is added to the time weighted integral stored in the capacitor of integrator 54 during the previous scan of gauge 16. Simultaneously, the charge on the capacitor included within integrator 55 is being reduced by the same percentage as the charge on the capacitor of integrator 54 was reduced to achieve time averaging. The same percentage of attenuation for integrators 54 and 55 occurs because the RC products of the discharge circuits of integrators 54 and 55 are the same and the integrator discharge times are identical. From the previous description, it should be evident as to how the average basis weight of the three zones across the width of sheet 11 are time weighted or averaged over successive scans of gauge 16 across the sheet.

Time averaging the output of profile averaging computer 42 over a plurality of scans by gauge 16 across the width of sheet 11 is accomplished utilizing the same basic principles as applied to time weighting the average basis weight in each of the zones. The equipment for time averaging the output of computer 42 differs, however, from that utilized in conjunction with integrators 54–56. In particular, the time averaging process associated with computer 42 is initiated only after a scan of gauge 16 across shet 11 has been completed. To this end, resistor 67 is connected across capacitor 48 by closure of the normally open contacts 68 of relay 69 in response to gauge 16 contacting microswitch 46. Microswitch 46 energizes relay 69 via timer 71, which maintains coils 69 in the energized condition for a suitable time interval, for example, ten seconds, immediately after activation of the microswitch. The values of capacitor 48 and resistor 67, as well as the ten second period during which they are connected together by contact 68, reduces the charge across capacitor 48 by the same percentage as the charge reduction resulting from each connection of a capacitor in one of integrators 54–56 to resistor 61. Thereby, the voltage stored on capacitor 48 is time weighted after each scan of gauge 16.

Time weighting the voltage on capacitor 48 is performed before the average basis weight signal derived from computer 42 for the immediately preceding scan has been coupled to the integrator comprising resistor 47 and capacitor 48 through contacts 49. Thereby, the most recent basis weight signal is stored on capacitor 48 with maximum amplitude and all previously accumulated basis weight signals are exponentially reduced in magnitude. Time weighting the voltage accumulated on capacitor 48 prior to readout of computer 42 is performed because contacts 68 are released ten seconds after initial activation of microswitch 46 while contacts 49 are closed fifteen seconds after the initial microswitch energization.

The manner in which profile averaging computer 42 and the time averaging circuitry associated therewith function can best be understood by considering a pair of successive scans of gauge 16 across sheet 11. During the first scan, computer 42 integrates the D.C. basis weight output signal of measuring circuit 41 over the entire width of sheet 11. The signal derived from computer 42 is isolated from the remainder of the circuit because of the open circuit condition of contact 49. In response to gauge 16 traversing the entire width of sheet 11, microswitch 46 derives an output signal that activates timer 71, causing energization of coil 69 and closure of contacts 68 for a ten second time interval. Under the assumed conditions, capacitor 48 has no charge thereon and the voltage across it remains zero. Fifteen seconds after activation of microswitch 46, five seconds after deenergization of coil 69, delay element 52 delivers a pulse to energize coil 51 and close contacts 49. Closure of contacts 49 results in the average basis weight output of computer 42 being integrated by the network comprising resistor 47 and capacitor 48. Relay coil 51 remains energized for a fixed time interval, of approximately ten seconds, to achieve consistent integration of the output of computer 42 for successive readouts thereof. Thereafter, averaging computer 42 is reset to zero while gauge 16 returns to its initial position, and the output of profile averaging computer 42 is decoupled from the remainder of the circuit because contacts 49 are open.

While gauge 16 returns to its initial location and retraverses sheet 11, the charge on capacitor 48 remains relatively constant, as the input to the integrating circuit comprising resistor 47 and capacitor 48 is an open circuit and the only load on the integralor output is the very high input impedance of an operational amplifier. Thereby, upon the completion of the second scan of gauge 16 across sheet 11, the voltage stored on capacitor 48 is substantially the same as the voltage applied to the capacitor by computer 42 upon the completion of the first scan of gauge 16.

After gauge 16 has scanned across sheet 11 a second time, the voltage stored on capacitor 48, indicative of the average basis weight from the first scan, is reduced by a predetermined factor, to effect time averaging. The voltage across capacitor 48 is reduced in response to energization of relay 69 by timer 71, that is in turn activated in repsonse to gauge 16 engaging microswitch 46. After the voltage stored on capacitor 48 has been reduced, the output of computer 42, indicative of the basis weight of sheet 11 at the machine direction location of the second scan of gauge 16, is applied to resistor 47 and capacitor 48. The average value of basis weight for the second scan is added to the voltage stored on capacitor 48, indicative of the time weighted average value resulting from the first scan. From the preceding description, it is believed obvious as to how successive scans of gauge 16 across sheet 11 result in further time weighting of the average value derived from computer 42.

The next operation is considering the manner in which cross direction variations are measured is to determine the deviations between the average value of basis weight for all three of the zones, as stored on capacitor 48, and the average value in each of the zones, as stored on the capacitors of integrators 54–56. To this end each of the zone average values is sequentially subtracted from the entire cross direction average value in operational, differential amplifier 75, having a relatively large input impedance.

One of the inputs to amplifier 75 is the voltage across capacitor 48, hence proportional to the average value of basis weight in the cross machine direction of sheet 11. The other input to amplifier 75 is selectively derived from one of the capacitors of integrators 54–56 and is coupled to the amplifier input via one of arcuate contacts 76–78 and armature 79 of switch 81.

Switch 81 is constructed identically to switches 44 and 62 but has its armature 79 displaced from armature 43 by an angle commensurate with one zone traverse of gauge 16 across sheet 11. Contacts 76-78 of switch 81 are connected across the capacitors of integrators 54-56, respectively. Thereby, immediately after gauge 16 traversing a particular zone across sheet 11, contact 79 feeds a voltage to differential amplifier 75 in accordance with the time weighted average basis weight in the previously scanned zone. For example, as gauge 16 is moving from zone 1 to zone 2 across sheet 11, the voltage across the capacitor of integrator 54 is being initially coupled into amplifier 75 via contacts 76 and 79.

The signals sequentially derived from the output of amplifier 75 are indicative of the deviations between the time weighted average basis weight across all of sheet 11 and the time weighted average basis weights in each of the three zones across the sheet. If relatively inaccurate representations of machine direction basis weight can be tolerated, the sequentially derived zone deviation signals generated by amplifier 75 can be subtracted from the output of measuring circuit 41 in operational, D.C. differential amplifier 45.

Frequently, however, it is desirable to interpolate between the discrete zone deviation signals sequentially derived from amplifier 75 to obtain a more accurate representation of basis weight at each cross machine direction point. To this end, the output of amplifier 75 is successively coupled to each of storage capacitors 82-84 via contacts 85-87 and armature 88 of switch 89. Switch 89 is constructed identically with each of switches 44, 62 and 81 and armature 88 thereof is always located in alignment with armature 79. Thereby, the difference voltage derived from amplifier 75 for a particular position of armature 79 is fed to a corresponding one of storage capacitors 82-84.

To provide an interpolated indication of the deviation between the average value of basis weight across all of sheeet 11 and the average value in each of the different zones, the voltages across capacitors 82-84 are applied to linear potentiometer 91, having taps 92-94 respectively connected to capacitors 82-84 by isolating amplifiers 95 and silder 96. The voltage at each of taps 92-94 of potentiometer 91 is a representation of cross direction basis weight variations at the center of each zone across sheet 11. Between a pair of taps, a linear voltage gradient is established commensurate with the difference in basis weight between adjacent zones. A relatively accurate representation of machine direction basis weight is thereby derived for each point across sheet 11 by synchronizing the movement of gauge 16 with potentiometer arm 96, driven by the output shaft of motor 17. The movement of arm 96 between taps 92 and 94 corresponds with the translation of gauge 16 from the center of zone 1 to the center of zone 3 across sheet 11. When gauge 16 has not reached the center of zone 1 and is beyond the center of zone 3, potentiometer arm 96 traverses portions of potentiometer 91 which are shorted between tap connections 92 and 92a and 94 and 94a. By approximating the basis weight characteristics at the edge of the sheet in this manner, problems associated with boundary layer interpolation are avoided.

The voltage at each point along potentiometer 91 is, therefore, a relatively accurate representation of cross direction basis weight variations, as indicated in FIG. 2c. Random basis weight fluctuations are substantially eliminated from the voltage of potentiometer 91 by scanning gauge 16 across sheet 11 a sufficient number of times because of the averaging process evolved over a number of scans.

The signal derived from tap 96 of potentiometer 91 can be utilized for automatically plotting averaged cross direction basis weight variation profiles by means of a conventional recorder 97. To this end, the signal from tap 96 is fed to the rebalancing servo 97a of the recorder. The servo positions the drive roll 97b for the strip chart 97c in accordance with the instantaneous value of the signal. The recorder pen and pointer assembly 97d is coupled to and driven by the gauge traversing motor 17, so that the lateral position of the pen on chart 97c corresponds to the lateral position of the gauge 16 on the sheet 11. A resultant recorded profile on the strip chart is shown at 98. Since the confusing random variations have been substantially eliminated, such a profile recording is a great aid to the paper machine operator for purposes such as making appropriate local adjustments of the flow rates across the width of the head box slice to achieve a flat, uniform cross direction profile in the sheet product.

The signal generated by potentiometer 91 can also be utilized for cancelling the cross direction basis weight variation from the total signal derived at any instant from measuring circuit 41 to achieve a machine direction basis weight signal. The cross direction basis weight signal derived from tap 96 is substracted from the output of measuring circuit 41 in operational, D.C. differential amplifier 45, the output of which drives meter 39 and/or controller 24, FIG. 1. The output of amplifier 45 is a D.C. voltage proportional to the instantaneous machine direction basis weight, without regard to random or cross direction variations in basis weight.

Reference is now made to FIG. 4 of the drawings, wherein there is illustrated a block diagram of a digital computer designed to perform substantially the same function as the analog computer network of FIG. 3. In the system of FIG. 4, it is again assumed that sheet 11 has only three traverse zones. Many of the digital computer components illustrated in FIGS. 4 and 5 derive parallel multi-bit words that require a bus having a plurality of leads. To simplify the drawing and description, each bus carrying a parallel multi-bit word is shown as a single lead.

In the controller of FIG. 4, as in the system of FIG. 3, the output of traversing gauge 16 is applied to measuring circuit 41, which derives a D.C. voltage that is applied to integrating analog-to-digital converter 101. Converter 101 derives a plural bit output signal indicative of the integral of basis weight for each of the zones crossed by gauge 16. Readout of integrating analog-to-digital converter 101 is performed only after gauge 16 has crossed one of the zones. To this end, the shaft position of traversing motor 17 is applied as an input to shaft-to-digital encoder 102, the output of which is fed in parallel to three comparators 103.

Each of comparators 103 is set to a different level, corresponding with the locations of the boundaries of the three zones. Thereby, while gauge 16 is in zone 1, the first one of comparators 103 derives a binary one output, while the other two comparators derive binary zero outputs. Similarly, while gauge 16 is in the second and third zones, the second and third comparators derive binary one outputs, to the exclusion of the remaining comparators.

The outputs of comparators 103 are applied to a different one of three differentiating-rectifier networks 104, each of which generates relatively short duration output pulses in response to the trailing edge of the output of the comparator to which it is connected. Thereby, the first one of differentiating-rectifier networks 104 generates a short duration pulse only while gauge 16 is crossing between the first and second zones; the second one of networks 104 derives a short duration pulse upon gauge 16 traversing the region between zones 2 and 3; and the third one of networks 104 generates a pulse when gauge 16 reaches the edge of paper 11.

The outputs of differentiating-rectifier networks 104 are combined in OR gate 105, which feeds integrating, analog-to-digital converter 101. In response to each output pulse of OR gate 105, the contents of converter 101 are read out and then reset to zero. Thereby, as gauge 16 completes a traverse of each zone across sheet 11, integrator 101 derives a binary output signal commensurate with the average value of basis weight across the zone. These average value signals are utilized for determining the basis weight values in each of the three zones, as well as the total basis weight across the entire sheet.

Zone basis weight is derived by coupling the output of integrating analog-to-digital converter 101 through three switches 106 to time weighting factor networks 107. Switches 106 are responsive to the outputs of differentiating-rectifier networks 104 and include stretching networks, whereby all of the bits in a binary word derived by integrator 101 are coupled to corresponding weight factor networks 107 upon the completion of gauge 16 traversing one of the zones.

As seen infra, time weighting factor networks 107 store the basis weight signals applied thereto and decrease the value of each basis weight signal after each scan of detector 16 across sheet 11. In particular, each of time weighting factor networks 107 stores a value after one scan of gauge 16 commensurate with the average basis weight in each of zones 1—3. After the second scan of gauge 16, the signal from the first scan is reduced by a factor of $a/1+a$ while the signal resulting from the second scan is reduced by $1/1+a$ and accumulated with the reduced value for the first scan. Upon completion of the third scan, the first signal applied to networks 107 is reduced by a factor of $$\frac{a^2}{1+a+a^2}$$

the second scan value is reduced by a factor of $$\frac{a}{1+a+a^2}$$

the most recent or third value derived from the scanning gauge 16 is reduced by $$\frac{1}{1+a+a^2}$$

and the three signals are accumulated or added together. The value of $a$ is selected as being between zero and one, whereby a reduction in prior basis weight values is achieved with each succeeding scan of gauge 16.

Weighting in the manner described enables an accurate indication of basis weight to be obtained regardless of the number of scans by detector 16 across sheet 11. If a linear time weighting process were employed, rather than an exponential process, as described, a relatively large number of scans of gauge 16 across sheet 11 would be required before the time weighted signal derived from network 107 would attain an approximately accurate value of basis weight in any zone.

The network for achieving time weighting as described is illustrated specifically in FIG. 5, described infra. To successively activate each of the weighting factor networks 107 after each zone of sheet 11 has been scanned by gauge 16, each of the weighting factor networks includes an input responsive to a correspondingly numbered one of networks 104, whereby each of the weighting factor networks is advanced to a new state upon the zone of sheet 11 associated therewith being scanned.

To determine the average basis weight of sheet 11 in the cross direction for each scan of the gauge 16, each output of integrating, analog-to-digital converter 101 is applied to accumulator 108. Accumulator 108 combines the three binary words derived from converter 101 during each scan of gauge 16 to provide a signal indicative of total basis weight across all three zones. Upon completion of a scan of gauge 16 across sheet 11, microswitch 46 supplies a binary one signal to accumulator 108. The binary one applied to accumulator 108 reads the accumulator contents into divide-by-three digital divider matrix 109 and thereafter resets the accumulator to a zero value. Resetting accumulator 108 to zero enables the accumulator to derive a total basis weight signal for the second scan of gauge 16 that is independent of the signal derived from the first scan. Thereby, integrator 101 and accumulator 108 perform a function similar to profile averaging computer 42, FIG. 3. To obtain a measure of actual average value across the entire sheet, it is necessary to divide the sum signal derived from accumulator 108 by a factor equal to the number of zones across sheet 11, in the present instance three, reflected in the division factor of dividing matrix 109.

The average value signal derived from divider matrix 109 is time weighted in network 111, which is activated by the output of microswitch 46 and operates in accordance with the same principles as indicated supra with regard to weighting factor networks 107.

To derive a signal proportional to the deviation between basis weight in each of the zones and the average basis weight across the entire sheet, the output of weighting factor network 111 is subtracted from each of the zone basis weight signals stored in weighting factor networks 107 and sequentially derived from them. To this end, the outputs of weighting factor networks 107 are sequentially gated through switch 112 to OR gate 113 that feeds one input of subtraction matrix 114, having a second input responsive to the output of weighting factor network 111. Three of switches 112 are provided, a different one being responsive to a different one of the weighting factor networks 107. Switches 112 are connected to the outputs derived from comparators 103 so that the switch responsive to the weighting factor network 107 for the first zone is enabled while gauge 16 is traversing the third zone of sheet 11; the switch responsive to the time weighted basis weight signal for the second zone is energized while gauge 16 is crossing the first zone; and the switch responsive to the time weighted basis weight signal for the third zone is activated while gauge 16 is crossing the second zone.

Comparators 103 are deactivated while motor 17 returns gauge 16 to its initial position because the output of encoder 102 is blanked during that interval. Similarly, the output of measuring circuit 41 is decoupled from the remainder of the circuit while gauge 16 is traversing sheet 11 towards its initial position at the edge of zone 1. Thereby, the entire computer of FIG. 4 is inoperative while gauge 16 is returning to its initial position.

The sequentially derived binary words generated by subtractor 114, indicative of the deviation of basis weight in each zone relative to the average basis weight across all three zones, could be combined directly with a digital signal indicative of the output of measuring circuit 41 to provide signals approximately commensurate with instantaneous machine direction basis weight. In such an instance, a measure of machine direction basis weight would be derived by applying the output of subtraction matrix 114 to subtraction matrix 115, having a digital input indicaitve of the instantaneous basis weight signal derived from gauge 16. The digital signal indicative of the instantaneous value of basis weight derived from gauge 16 is obtained by feeding the output of measuring circuit 41 to analog-to-digital converter 116, the output of which is applied to the other input of subtractor 115.

In the alternative, the sequentially derived basis weight signals can be applied to an interpolating unit to provide a more accurate instantaneous digital signal indicative of basis weight at any point across the width of the sheet being analyzed. The interpolating configuration is specifically described in conjunction with FIG. 4. To simplify the digital interpolation electronics, the basis weight across zone 1 is assumed constant, equal to the average basis weight across the entire zone. In zones 2 and 3, the linear interpolation is derived by assuming that the average zone values occur at the zone edges remote from the gauge scan starting point.

To effect interpolation with the assumed conditions, the output of subtraction matrix 114 is selectively gated to one of three cells comprising memory unit 117, one cell being provided for the multi-bit word derived for each of the three zones. Gating the output of subtraction matrix 114 to the selected cell in memory 117 is via three separate switches 118, one of each of the switches being provided for a different one of the memory cells and zones. The switches 118 for zones 1–3 are respectively responsive to the output of comparators 103 for zones 1–3. Thereby switches 112 and 118 are activated so that the basis weight deviation signals for zones 1–3, derived from matrix 114, are fed to the memory cells for zones 1, 2 and 3 while gauge 16 is scanning over zones 3, 1 and 2, respectively. By arranging switches 112 and 118 in combination with the cells of memory 117 in the manner stated, the most recent and updated data from time weighting factor networks 107 are read into memory 117.

With memory 117 appropriately loaded with basis weight signals for zones 1–3, the interpolation process is performed as gauge 16 traverses sheet 11. As mentioned supra, it is assumed that the basis weight across zone 1 is constant. Therefore, the contents of the first cell of memory 117 are read in unmodified form into subtractor 115 via multiplication matrix 119 and addition matrix 121, which matrices are cascaded between the output of the memory cell for zone 1 and one of the inputs to subtraction matrix 115.

Coupling the contents of the cell associated with zone 1 of memory 117 to subtraction matrix 115 in unmodified form is accomplished because the other input to multiplication matrix 119 is a binary one signal and no other inputs are applied to adding matrix 121 while gauge 16 is in zone 1. To these ends, the zone indicating signals derived from comparators 103 are combined in logic network 124 that feeds binary zero signals to one of the inputs of each of multiplication matrices 122 and 123, the other inputs of which are respectively responsive to the cells in memory 117 for the second and third zones. Simultaneously, logic network 124 feeds a binary one input to multiplier 119 while gauge 16 is traversing zone 1 by coupling the output of the first zone comparator 103 through OR gate 125 to an input of multiplier 119. The other input to OR gate 125, responsive to the output of inhibit gate 126, is a binary zero level while gauge 16 is traversing zone 1 since the binary one output of the first zone comparator 103 is applied to the inhibit terminal of inhibit gate 126.

Consideration will now be given to the technique for performing linear interpolation in the second zone. In the second zone, it can be approximately assumed that basis weight varies in accordance with:

$$(1-x)A + Bx \qquad (1)$$

where:

A and B are the basis weights for zones 1 and 2, respectively; and
$x$ is the distance in zone 2 from the boundary of zones 1 and 2 to the point under consideration.

To perform linear interpolation in the second zone, the outputs of cells 1 and 2 of memory 117 are multiplied by $(1-x)$ and $x$, respectively.

To derive the terms $(1-x)$ and $x$, the output of shaft to digital encoder 102 is applied as one input to subtraction matrix 127, the other input of which is a binary signal indicative of the position of the zone boundary. The signal indicative of zone boundary position is derived by feeding the output of OR gate 105 to counter 128, which derives a binary signal commensurate with the number of the zone where gauge 16 is located. The binary output of counter 128 is applied to multiplier matrix 129, prewired with a response indicative of the total distance across each zone, which distance is the same for all zones. Hence, at any time instant, the output of subtraction matrix 127 is a binary signal commensurate with the position of gauge 16 from the edge of each zone boundary, the term $x$ in Equation 1. To derive the term $(1-x)$ in Equation 1, the output of multiplier matrix 127 is fed to prewired matrix 131, arranged to provide the one's complement of the matrix 127 output.

The $x$ and $(1-x)$ outputs of matrices 127 and 131 are coupled as inputs to multiplier matrices 119 and 122 via AND gates 132 and 133 and OR gate 134 in logic network 124. AND gate 132 is responsive to the output of complementing matrix 131 and the output of the second zone comparator 103. The output of AND gate 132 is fed to inhibit gate 12 and, during the traverse of gauge 16 through the second zone, is passed through the inhibit gate and OR gate 125 to multiplier 119 as the $(1-x)$ input to the multiplier. While gauge 16 traverses the second zone, the output of second zone comparator 103 is applied as an input to AND gate 133, whereby the $x$ output of matrix 127 is applied to an input of multiplier 122 via OR gate 134. The outputs of matrices 119 and 122 are combined in adder matrix 121 to provide an approximate indication of cross direction basis weight for many different positions across zone 2. The indication of cross direction basis weight is subtracted from the actual basis weight signal, as derived from measuring circuit 41 and analog-to-digital converter 116, in subtraction matrix 115, the output of which is a relatively accurate measure of instantaneous machine direction basis weight throughout zone 2.

Consideration is now given to the interpolation process while guage 16 crosses the third zone of sheet 11. During said scan period, the second zone basis weight signals are multiplied by the factor $(1-x)$, while the third zone signals are multiplied by the factor $x$. The $x$ and $(1-x)$ output signals of matrices 127 and 131 are coupled to multiplication matrices 123 and 122, respectively, via AND gates 135 and 136 and OR gate 134. The $(1-x)$ output of complementing matrix 131 is coupled through AND gate 135 since the other input to the AND gate is responsive to the binary one output of the zone 3 comparator 103. The output of AND gate 135 is coupled through OR gate 134 to an input of multiplier 122, to effect multiplication of the zone 2 basis weight by the factor $(1-x)$. The output of subtraction matrix 127 is coupled through AND gate 136 by the connection of one of the AND gate inputs to the zone 3 comparator 103, whereby multiplier 123 responds to signals commensurate with $x$ and basis weight for the third zone.

With guage 16 scanning the third zone, finite outputs are generally derived from multipliers 122 and 123, to the exclusion of multiplier 119 and these two finite outputs are added in matrix 121. As indicated supra, the instantaneous cross direction signal derived from matrix 121 is subtracted from the instantaneous total basis weight signal generated by analog-to-digital converter 116 whereby subtraction matrix 115 provides a digital output commensurate with the instantaneous machine direction basis weight as guage 16 crosses zone 3.

The cross direction (C.D.) output of adder matrix 121 can be fed to a suitable recorder, which also receives the output of shaft to digital encoder 102, and utilized thereby for automatically plotting C.D. profiles similar to profile recording 98 shown in FIGURE 3. The machine direction (M.D.) output of subtraction matrix 115 can be used in a conventional manner to control motorized value 21 (FIGURE 1) so as to automatically maintain the desired machine direction basis weight.

Consideration is now given to the specific circuitry and theory involved in digital time weighting factor networks 107 and 111, FIGURE 4. The weighting factor for each scan of guage 16 across sheet 11 is reduced from scan to scan, whereby after one scan the basis weight signal is given full value; after a second scan the value of the first and second scans are respectively reduced by the factors $$\frac{a}{1+a} \text{ and } \frac{1}{1+a}$$

after the third scan the values of the first, second and third scans are respectively reduced by factors of $$\frac{a^2}{1+a+a^2}, \frac{a}{1+a+a^2} \text{ and } \frac{1}{1+a+a^2}$$

for succeeding scans the values are similarly reduced.

For a large number of scans, it can be shown that the time weighted average value of basis weight is given by:

$$\bar{x}_0 = \frac{(X_0 + ax_1 + a^2x_2 + \ldots + a^n x_n)}{(1+a+a^2+ \ldots +a^n)} \qquad (2)$$

Equation 2 can be derived as follows:
The average value of basis weight for the first scan is:

$$\bar{x}_n = x_n \qquad (3)$$

Upon completion of the second scan, the average values for the first and second scans are added or accumulated together, in accordance with:

$$\bar{x}_{n-1} = \frac{x_{n-1}}{1+a} + \frac{ax_n}{1+a} = \frac{x_{n-1}+ax_n}{1+a} \qquad (4)$$

Upon the completion of the third scan, the time weighted average is found by forming the sum:

$$\bar{x}_{n-2} = \frac{x_{n-2}}{1+a+a_2} + \frac{ax_{n-1}}{1+a+a^2} + \frac{a^2 x_{n-2}}{1+a+a_2}$$

$$= \frac{x_{n-2}+ax_{n-1}+a^2 x_{n-2}}{1+a+a^2} \qquad (5)$$

Equation (5) can be rewritten as:

$$\bar{x}_{n-2} = \frac{x_{n-2}+a(1+a)\bar{x}_{n-1}}{1+a+a^2} \qquad (5a)$$

From Equation 5a, the time weighted value of basis weight after $n$ scans of guage 16 across sheet 11 is:

$$\bar{x}_0 = \frac{x_0+aS_{n-1}\bar{x}_1}{S_n} \qquad (6)$$

where: $x_0$ is the average value of basis weight for the most recent scan, $\bar{x}_1$ is the time weighted average of basis weight for the scan immediately before the scan which resulted in $x_0$; and $$S_n = 1+a+a^2+ \ldots +a^n$$

The apparatus utilized for solving time weighted basis weight in accordance with Equation 6 is illustrated by the schematic diagram of FIGURE 5. The weighting network of FIGURE 5 comprises, broadly, four registers 141–144, sequencing controller 145, memory 146 and arithmetic unit 147. Registers 141–144 and memory 146 store values prior to the computation for $\bar{x}_0$ in accordance with:

TABLE I

| Register: | Value prior to computation for $\bar{x}_0$ |
| --- | --- |
| 141 | $a$ |
| 142 | $a^{n-1}$ |
| 143 | $S_{n-1}$ |
| 144 | $\bar{x}_2 a S_{n-2}$ |
| Memory: | |
| 146 | $\bar{x}_1$ | where:
$\bar{x}_2$ is the time weighted basis weight two scans prior to the scan being considered.

Arithmetic unit 147 responds to the contents of registers 141–144 and memory 146 and the instructions of controller 145 to compute the value of $\bar{x}_0$ in a sequence of steps given by:

TABLE II (1) Multiply $\bar{x}_1$ by "$a$" (register 141)
(2) Multiply $\bar{x}_1 a$ by $S_{n-1}$ (register 143) and place result in register 144
(3) Multiply $a^{n-1}$ (register 142) by "$a$" (register 141) and place result in register 142
(4) Add $a^n$ (register 142) to $S_{n-1}$ (register 143) and place result in register 143
(5) Add $x_0$ to $x_1 a S_{n-1}$ (register 144) and hold result
(6) Divide the above result by $S_n$ (register 143) and output the result ($\bar{x}_0$) to memory.

To control arithmetic unit 147, controller 145 is formed as an eight stage shift register having sequential outputs, designated as 1, 2, 2', 3, 3', 4, 5 and 6. In weighting factor network 111 the steps of controller 145 are derived in sequence upon the completion of a scan by gauge 16 across sheet 11 in response to microswitch 146 deriving a binary one output. In zone weighting factor networks 107, however, arithmetic units 147 are activated upon the completion of gauge 16 scanning one of the zones.

To control networks 107, the output of each of the three differentiators 104 activates the controllers 106 of the corresponding weighting factor networks. Because integrating analog-to-digital converter 101 derives a signal unrelated to the values coupled to weighting factor networks 107 while weighting factor networks 107 are computing time weighting functions, these weighting factor networks include memory 148. Weighting factor network 111 need not include such a memory because accumulator 108 performs the identical function.

The two main units included within arithmetic unit 147 are multiplication and addition matrices 151 and 152. With controller 145 in the first step, multiplier 151 responds to the $\bar{x}_1$ contents of memory 146 and the ($a$) signal stored in register 141 via paths established through switches 153 and 154, as well as OR gates 155 and 156. In the output of multiplier 151 is included a scratch pad memory (not shown), whereby the product derived from the multiplier is stored while controller 145 is stepped to the second stage. With controller 145 in the second stage, switches 157 and 158 are closed and the product $a\bar{x}_1$ in the multiplier 151 scratch pad memory is multiplied with the contents of register 143 in matrix 151. Controller 145 is now stepped to stage 2', whereby the $S_{n-1}a\bar{x}_1$ signal now stored in the scratch pad memory of multiplier 151 is read into register 144 by the connection established through switch 159, that is closed by the stage 2' output of controller 145.

Controller 145 is now stepped to the third stage, whereby switches 161 and 162, respectively responsive to the $a$ and $a^{n-1}$ signals of registers 141 and 142, are closed. Closure of switches 161 and 162 results in the contents of registers 141 and 142 being multiplied in matrix 151, whereby the scratch pad memory of the matrix is loaded with the product $a \cdot a^{n-1}=a^n$ until controller 145 is activated to step 3'. Activation of controller 145 to step 3' results in closure of switch 163, connected between the output of matrix 151 and the input of register 142. Thereby, a signal commensurate with $a^n$ is fed to register 142.

Controller 145 is now activated to the fourth step, resulting in the closure of switches 164, 165 and 166, respectively connected to the outputs of registers 142, 143 and adding matrix 152. Closing switches 164 and 165 enables the contents of registers 142 and 143 to be supplied to the inputs of addition matrix 152 via OR gates 167 and 168, respectively. Addition matrix 152 responds to the $a^n$ and $S_{n-1}$ contents of registers 142 and 143 to derive the sum $(a^n+S_{n-1})$, which is fed through switch 166 to register 143.

Controller 145 is now activated to the fifth step, to close switches 171, 172 and 173, respecitvely responsive to the output of register 144, the $x_0$ signal, and the output of adder matrix 152. Closure of switches 171 and 172 enables the $x_0$ and $a\bar{x}_1 S_{n-1}$ signals to be coupled to adder matrix 152 via OR gates 167 and 168. The $(x_0+a\bar{x}_1 S_{n-1})$ output of matrix 152 is applied through the switch 173 to the scratch pad memory 174, that holds it until controller 145 is advanced to the sixth stage.

In response to controller 145 being activated to the sixth stage, switches 175 and 176, respectively responsive to the outputs of scratch pad memory 174 and register 143, are closed. The $S_{n-1}$ and $(x_0+a\bar{x}_1 S_{n+1})$ signals coupled through switches 175 and 176 are respectively applied as dividend and divisor inputs to divider matrix 177. The contents of divider matrix 177 are coupled through switch 178 to the weighting circuit output and memory 146 via switch 178, that is closed in response to controller 145 being advanced to the sixth step.

The manner in which registers 141–144 and memory 146 are preloaded to the values indicated by Table I prior to computation for $\bar{x}_0$ should now be evident. In particular, register 141 is prewired with the value $a$. Register 142 is loaded to the value $a^{n-1}$ by virtue of the multiplication process of matrix 151 during steps 3 and 3' of controller 145. Register 143 is loaded to the sum signal $S_{n-1}$ in response to the contents thereof being added to the contents of register 142 in matrix 152 during step 4 of controller 145. Register 144 is activated to store a signal in accordance with $a\bar{x}_2 S_{n-2}$ in response to the contents of the scratch pad memory of multiplier 151 and the contents of register 143 during steps 2 and 2' of controller 145. Memory 146 is loaded with the value $\bar{x}_1$ during the last or sixth step of controller 145 because the contents of scratch pad memory 174 are divided by the contents of register 143. Prior to any scans of gauge 16 across sheet 11, each of registers 143–144, and memory 146 is loaded with binary zeros, while register 141 is wired in accordance with the selected value of $a$ and register 142 is loaded with the unity value at the outset of the weighted average computation.

While I have described and illustrated several specific embodiments of my invention, it will be clear that variations in the details of the embodiments specifically illustrated and described may be made without departing from the true spirit and scope of the invention.

I claim:

1. A method of measuring a property of a moving sheet, said sheet moving in a machine direction, comprising scanning a detector of the property transversely of the sheet edges several times, from the scanning detector response computing the deviations of the property in a plurality of zones running parallel to the machine direction from the average value of the property for all of the zones, repeating the computation for each of said scans and thereby at different machine direction locations, and accumulating the deviations resulting from the steps being repeated.

2. The method of claim 1 wherein the accumulated deviations are time weighted.

3. The method of claim 2 further including the step of interpolating the property indications derived for each zone from zone to zone.

4. The method of claim 1 further including the step of interpolating the property indications derived for each zone from zone to zone.

5. The method of claim 1 further including sequentially reading out the accumulated deviation for each zone, and combining the sequentially read out deviations with a measure of the property for the zone being read out to provide an indication of the property in the machine direction.

6. The method of claim 5 further including the step of controlling a machine direction characteristic of the sheet related to the property in response to the machine direction property indication.

7. The method of claim 5 wherein the accumulated deviations are time weighted.

8. The method of claim 5 further including the step of interpolating the property indications derived for each zone from zone to zone.

9. The method of claim 8 wherein the accumulated deviations are time weighted.

10. A method of measuring a property of a moving sheet, said sheet moving in a machine direction, comprising measuring a property of the sheet at the same cross direction location and at a plurality of different, noncontiguous regions along the sheet in the machine direction, accumulating the measured values, and subtracting the accumulated measured values from a value indicative of the property at one of said regions to provide an indication of the property in the machine direction.

11. The method of claim 10 further including the step of controlling a machine direction characteristic of the sheet related to the property in response to the machine direction property indication.

12. A system for measuring a property of a sheet moving in a machine direction, said property being measured in response to signals derived from detector means sensing the property in different zones across the width of the sheet, said detector means deriving signals from a plurality of machine direction regions, comprising means for scanning the detector means in a direction between the sheet edges, means responsive to the scanning detector means for deriving signals indicative of a function of the property in the location at each of said regions and for different zones across the width of the sheet, means for separately accumulating the derived functions for each of the zones, means for deriving the signals for the different machine direction regions and zones from the detector means in sequence, and means for time weighting the sequentially derived accumulated signals for each of the zones.

13. The system of claim 12 wherein the signals are time weighted by differing decreasing amounts as a function of time.

14. The system of claim 13 wherein the signals are time weighted exponentially.

15. The system of claim 12 wherein the signals are time weighted in accordance with:

$$\bar{x}_0 = \frac{x_0 + aS_{n-1}\bar{x}_1}{S_n}$$

where:
  $\bar{x}_0$ is the time weighted value after the most recently derived signal;
  $x_0$ is the value of the most recently derived signal;
  $a$ is a constant between zero and one;
  $S_n = 1 + a + a^2 + \ldots + a^n$;
  $S_{n-1} = 1 + a + a^2 + \ldots + a^{n-1}$;
  $n$ is the number of sequentially derived signals; and
  $\bar{x}_1$ is the time weighted average after the signal derived immediately prior to the most recently derived signal.

16. A system for measuring a machine direction property of a moving sheet to the substantial exclusion of cross direction variations of the sheet in response to signals derived from detector means sensing the property at a plurality of zones in the cross direction and a plurality of machine direction locations for each zone comprising means responsive to the detector means for deriving a function of the property at each zone and each location, means responsive to said deriving means for accumulating separately from the properties sensed at the plural machine direction locations the functions for each zone, and means for forming the difference between the signal from the detector means for each zone and the accumulated function for each zone to provide an indication of the machine direction property.

17. The system of claim 16 wherein said deriving means includes means for computing the function in accordance with the deviation of the property in the zone from the average value of the property across all of the zones.

18. The system of claim 16 including means for deriving the signals in time sequence for different machine direction locations, said accumulating means including means for time weighting the sequentially derived signals.

19. The system of claim 18 wherein the signals are time weighted by differing decreasing amounts as a function of time.

20. The system of claim 19 wherein the signals are time weighted exponentially.

21. The system of claim 20 wherein the signals are time weighted in accordance with:

$$\bar{x}_0 = \frac{x_0 + aS_{n-1}\bar{x}_1}{S_n}$$

where:
$\bar{x}_0$ is the time weighted value after the most recently derived signal;
$x_0$ is the value of the most recently derived signal;
$a$ is a constant between zero and one;
$S_n = 1 + a + a^2 + \ldots + a^n$;
$S_{n-1} = 1 + a + a^2 + \ldots + a^{n-1}$;
$n$ is the number of sequentially derived signals; and
$\bar{x}_1$ is the time weighted average after the signal derived immediately prior to the most recently derived signal.

22. The system of claim 16 further including means for controlling a machine direction characteristic of the sheet related to the property in response to the machine direction property indication.

23. A system for measuring a machine direction property of a moving sheet to the substantial exclusion of cross direction variations of the sheet property comprising a detector for said property, means for scanning said detector across the sheet, said detector being scanned across the sheet a plurality of times, means responsive to said scanning detector for deriving a function of the property at a plurality of zones across the sheet for each scan of the detector, means for separately accumulating the functions for each zone in response to each scan, and means for forming the difference between the instantaneous property measurement derived from the detector and the accumulated function corresponding with the zone in which the detector is located to provide an indication of the machine direction property.

24. The system of claim 23 further including means responsive to the machine direction indication for controlling a machine direction characteristic of the sheet related to the property in response to the machine direction property indication.

25. The system of claim 23 wherein said accumulation means includes means for time weighting the accumulated functions by differing decreasing amounts for each scan of the detector.

26. The system of claim 25 wherein the signals are time weighted exponentially.

27. The system of claim 25 wherein the signals are time weighted in accordance with:

$$\bar{x}_0 = \frac{x_0 + aS_{n-1}\bar{x}_1}{S_n}$$

where:
$\bar{x}_0$ is the time weighted value after the most recently derived signal;
$x_0$ is the value of the most recently derived signal;
$a$ is a constant between zero and one;
$S_n = 1 + a + a^2 + \ldots + a^n$;
$S_{n-1} = 1 + a + a^2 + \ldots + a^{n-1}$;
$n$ is the number of sequentially derived signals; and
$\bar{x}_1$ is the time weighted average after the signal derived immediately prior to the most recently derived signal.

28. The system of claim 23 including means for interpolating the accumulated function corresponding with the different zones from zone to zone.

29. A system for extracting information regarding a property of a longitudinally translating sheet comprising a gauge for deriving a signal indicative of said property, means for scanning the gauge transversely of the edges of the translating sheet, said gauge being scanned transversely of the translating sheet a plurality of times, memory means responsive to said scanning gauge for storing first signals indicative of a function of the property values at a multiplicity of different discrete cross sheet zones for several of said scans, means responsive to the first signals stored in said memory means for deriving second signals indicative of the deviation of a stored property value from the average of a plurality of property values derived from several of said scans, and means responsive to said deriving means for combining said second signals with a function of the property indicating signals derived from the scanning gauge.

30. The system of claim 29 wherein said deriving means includes means for deriving each of the second signals as an indication of the deviation of the average property value for one of said zones as derived from several of said scans from the average of a plurality of property values derived from all of said zones.

31. The system of claim 29 wherein said combining means includes means for deriving a signal indicative of a machine direction property of said sheet, and means for controlling a machine direction characteristic of said sheet related to said property in response to the machine direction indicating signal.

32. In a method of extracting information regarding a property of a longitudinally translating sheet with a gauge for measuring said property, the steps of scanning said gauge transversely of the edges of the moving sheet a plurality of times, storing indications of the property values sensed by the scanning gauge at several different discrete cross sheet zones, computing from the stored indications the deviation of a stored property value relative to the average value of a plurality of property values derived from several of said scans, and combining the deviation with a function of the scanning gauge response.

33. The method of claim 32 wherein the computing step comprises deriving an indication of the deviation of the average property value for one of said zones as derived from several of said scans from the average of a plurality of property values derived from all of said zones.

34. The method of claim 32 wherein the combined deviation and the gauge response are indicative of a machine direction property of said sheet, and controlling a machine direction characteristic of said sheet related to said property in response to the combined deviation and the gauge response indication.

35. In a method of extracting information regarding a property of a longitudinally translating sheet with a gauge for measuring said property and computer means including memory means and arithmetic means, the steps of scanning said gauge transversely of the edges of the moving sheet a plurality of times, feeding signals indicative of the response of the scanning gauge to said memory means so that there are stored in said memory means signals indicative of the property at several different discrete cross sheet zones, feeding property indicating signals from the memory to said arithmetic means to derive indications of the deviation of a stored property value relative to the average value of a plurality of values derived from several of said scans, and combining in the arithmetic means the deviation with a function of the scanning gauge response.

36. The method of claim 35 wherein the arithmetic means derives said indications as the deviation of the average property value for one of said zones as derived of a stored property value from the average of a plurality of property values derived from all of said zones.

37. A system for extracting information regarding a property of a longitudinally translating sheet comprising a gauge for deriving a signal indicative of said property, means for scanning the gauge transversely of the edges of the translating sheet, said gauge being scanned transversely of the translating sheet a plurality of times, memory means responsive to said scanning gauge for storing first signals indicative of a function of the property values at a multiplicity of different discrete cross sheet zones for several of said scans, said zones running in the direction the sheet is translating, means responsive to the first signals stored in said memory means for deriving second signals indicative of the deviation for each of said zones of a stored property value form the average of a plurality of property values derived from several of said scans, and means for displaying said second signals as a function of the cross sheet position of said gauge, said display means including means for displaying the cross sheet position and second signals in coordinate directions at right angles to each other.

38. The system of claim 37 further including means responsive to said scanning means for synchronizing the cross sheet position of said display means with scanning of said gauge across said sheet.

39. A system for extracting information regarding a property of a longitudinally translating sheet comprising a gauge means for deriving first signals indicative of said property at a plurality of zones across the width of the sheet and running in the direction the sheet is translating, means responsive to said gauge means for deriving a second signal representing the value of said property for one point in each of said zones, and interpolating means responsive to said second signal deriving means for deriving third signal indicative of interpolations between the values of the second signals for each of the zones.

40. The system of claim 39 wherein said gauge means includes a scanning gauge and further including display means responsive to said third signal deriving means for displaying the third signal as a function of the cross sheet position of the gauge, said display means including means for displaying the cross sheet position and third signals in coordinate directions at right angles to each other.

41. A system for extracting information regarding a property of a longitudinally translating sheet comprising gauge means having a response indicative of the value of said property at a plurality of zones across the width of the sheet and running in the direction the sheet is translating, said gauge means deriving different signals for each of said zones for different machine direction locations of the sheet, memory means responsive to said gauge means for storing signals indicative of a function of the response property values at each of the zones and for several different machine direction locations, means responsive to the signals stored in said memory means for deriving second signals indicative of a function of the property value at each of said zones, said last named means including means for deriving the second signals with time weighting for different machine direction locations to reduce in amplitude the second signals as an inverse function of the time from which the response corresponding therewith was derived.

42. The system of claim 41 wherein the signals are time weighted exponentially.

43. The system of claim 42 wherein the signals are time weighted in accordance with:

$$\bar{x}_0 = \frac{x_0 + aS_{n-1}\bar{x}_1}{S_n}$$

where:
$\bar{x}$ is the weighted value after the most recently derived signal;
$x_0$ is the value of the most recently derived signal;
$a$ is a constant between zero and one;
$S_n = 1 + a + a^2 \ldots + a^n$;
$S_{n-1} = 1 + a + a^2 + \ldots + a^{n-1}$;
$n$ is the number of sequentially derived signals; and
$\bar{x}_1$ is the time weighted average after the signal derived immediately prior to the most recently derived signal.

44. The system of claim 41 wherein said second signals are indicative of the deviation of the stored property value at each of said zones from the average of a plurality of property values derived from several different machine direction locations.

45. A system for extracting information regarding a property of a longitudinally translating sheet comprising a gauge for deriving a signal indicative of said property, means for scanning the gauge transversely of the edges of the tarnslating sheet, said gauge being scanned across the translating sheet a plurality of times, means responsive to the scanning gauge for computing the deviations of the property in a plurality of zones transverse to the direction of sheet translation and running in the direction the sheet is translating from the average value of the property for all of the zones, said computation being repeated for each of said scans and thereby at different machine direction locations, and means responsive to said computing means for accumulating the deviations resulting from the repeated scans.

46. The system of claim 37 wherein said deriving means includes additional means for deriving each of said second signals in accordance with said deviation for a point in each of said zones, and interpolating means for deriving said second signals as being indicative of interpolations between the values of the property values at the points on said zones.

47. The system of claim 46 wherein said second signal deriving means includes means for deriving the second signals with time weighting for different scans of the guage to reduce in amplitude the second signals as an inverse function of the time from which the response corresponding therewith was derived.

48. The system of claim 37 wherein said second signal deriving means includes means for deriving the second signals with time weighting for different scans of the gauge to reduce in amplitude the second signals as an inverse function of the time from which the response corresponding therewith was derived.

49. The system of claim 39 wherein said signals are derived at a plurality of machine direction locations, further including memory means responsive to said gauge means for storing signals indicative of a function of the gauge means output for each of said zones for several of the machine direction locations, said deriving means including means for deriving each of said second signals with time weighting for different machine direction locations to reduce in amplitude the signals as an inverse function of the time from which the response corresponding therewith was derived.

50. The system of claim 39 wherein said gauge means is responsive to the sheet at a plurality of locations in the direction the sheet is running, and said second signal deriving means includes means for accumulating the first signals in each of said zones to derive the second signals as a function of the accumulated first signals.

51. The system of claim 50 wherein said gauge means includes a scanning gauge and further including display means responsive to said third signal deriving means for displaying the third signal as a function of the cross sheet position of the gauge, said display means including means for displaying the cross sheet position and third signals in coordinate directions at right angles to each other.

52. A method for extracting information regarding a property of a longitudinally translating sheet comprising the steps of scanning a detector for the property transversely of the sheet edges several times, from the scanning detector response accumulating the property values detected from each scan in each of a plurality of zones occupying different cross sheet locations and running in the direction of sheet translation, and interpolating between values indicative of a function of the accumulated property values for adjacent ones of said zones.

53. The method of claim 52 further including the step of displaying in coordinate directions at right angles to each other the function of the accumulated property values as a function of cross sheet position of the detector.

References Cited
UNITED STATES PATENTS

| | | | |
|---|---|---|---|
| 2,909,660 | 10/1959 | Alexander | 162—259UX |
| 2,950,508 | 8/1960 | Locher | 73—159X |
| 3,000,438 | 9/1961 | Alexander | 162—259 |
| 3,024,404 | 3/1962 | Ziffer | 162—198X |
| 3,040,807 | 6/1962 | Chope | 162—263X |
| 3,108,844 | 10/1963 | Alexander et al. | 346—49X |
| 3,244,881 | 4/1966 | Hansen et al. | 250—52X |
| 3,307,215 | 3/1967 | Gerhard et al. | 250—52X |
| 3,413,192 | 11/1968 | Beecher | 162—259 |

S. CLEMENT SWISHER, Primary Examiner

U.S. Cl. X.R.

162—198, 263